United States Patent
Griesser et al.

(10) Patent No.: US 10,953,859 B2
(45) Date of Patent: Mar. 23, 2021

(54) PNEUMATIC BRAKING DEVICE FOR A UTILITY VEHICLE

(71) Applicant: KNORR-BREMSE Systeme fuer Nutzfahrzeuge GmbH, Munich (DE)

(72) Inventors: Fabian Griesser, Munich (DE); Christian Kuhlen, Aschheim (DE); Karsten Schnittger, Munich (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 151 days.

(21) Appl. No.: 15/973,052

(22) Filed: May 7, 2018

(65) Prior Publication Data

US 2018/0251112 A1  Sep. 6, 2018

Related U.S. Application Data

(63) Continuation of application No. PCT/EP2016/076410, filed on Nov. 2, 2016.

(30) Foreign Application Priority Data

Nov. 6, 2015  (DE) .................... 10 2015 119 136.9

(51) Int. Cl.
  *B60T 8/36*    (2006.01)
  *B60T 13/26*   (2006.01)
  (Continued)

(52) U.S. Cl.
  CPC .......... *B60T 13/263* (2013.01); *B60T 11/326* (2013.01); *B60T 13/22* (2013.01); *B60T 13/261* (2013.01);
  (Continued)

(58) Field of Classification Search
  CPC .......... B60T 8/36; B60T 11/326; B60T 13/04; B60T 13/263; B60T 13/588; B60T 13/662; B60T 13/683
  (Continued)

(56) References Cited

U.S. PATENT DOCUMENTS 5,061,015 A   10/1991  Cramer et al.
8,794,718 B2 *  8/2014  Bensch .................. B60T 8/362
                                                137/596.1
(Continued)

FOREIGN PATENT DOCUMENTS

DE         101 32 493 A1    1/2003
DE    10 2005 058 799 A1    6/2007
(Continued)

OTHER PUBLICATIONS

International Search Report (PCT/ISA/210) issued in PCT Application No. PCT/EP2016/076410 dated Feb. 7, 2017 with English-language translation (Five (5) pages).

(Continued)

*Primary Examiner* — Christopher P Schwartz
(74) *Attorney, Agent, or Firm* — Crowell & Moring LLP

(57) ABSTRACT

A pneumatic braking device for a utility vehicle includes at least one pneumatically controllable spring accumulator for a parking brake of the utility vehicle with an electronic parking brake device. The electronic parking brake device has at least one electronic control unit, at least one first bistable valve unit, at least one second bistable valve unit, at least one valve device which can be connected in such a way that when there is a decrease in the system pressure for supplying the parking brake of the trailer of the traction vehicle, the parking brake of the trailer can be activated, and a traction vehicle protection valve.

12 Claims, 7 Drawing Sheets

(51) Int. Cl.
    *B60T 11/32*     (2006.01)
    *B60T 13/22*     (2006.01)
    *B60T 13/38*     (2006.01)
    *B60T 15/04*     (2006.01)
    *B60T 13/66*     (2006.01)
    *B60T 13/68*     (2006.01)
    *B60T 17/00*     (2006.01)

(52) U.S. Cl.
    CPC .......... *B60T 13/385* (2013.01); *B60T 13/662* (2013.01); *B60T 13/683* (2013.01); *B60T 15/041* (2013.01); *B60T 17/004* (2013.01); *B60T 2270/403* (2013.01)

(58) Field of Classification Search
    USPC ............. 303/3, 7, 9.61, 123, 127; 188/112 R
    See application file for complete search history.

(56) References Cited

U.S. PATENT DOCUMENTS

| | | | |
|---|---|---|---|
| 2005/0029859 A1* | 2/2005 | Bensch | B60T 7/10 303/89 |
| 2005/0116533 A1 | 6/2005 | Herges et al. | |
| 2009/0309413 A1 | 12/2009 | Bensch et al. | |
| 2010/0025141 A1* | 2/2010 | Bensch | B60T 13/683 180/271 |
| 2010/0078988 A1* | 4/2010 | Bensch | B60T 13/04 303/3 |
| 2011/0062774 A1* | 3/2011 | Bensch | B60T 13/683 303/9.61 |
| 2011/0266100 A1* | 11/2011 | Balogh | B60T 13/385 188/106 P |
| 2012/0073669 A1* | 3/2012 | Diekmeyer | B60G 17/0523 137/1 |
| 2013/0015024 A1 | 1/2013 | Vuckovic | |
| 2013/0214588 A1* | 8/2013 | Kiel | B60T 13/683 303/6.01 |
| 2014/0103237 A1* | 4/2014 | Herges | B60T 7/20 251/129.01 |
| 2018/0229708 A1* | 8/2018 | Sieker | B60T 7/20 |
| 2018/0251111 A1* | 9/2018 | Schnittger | B60T 17/004 |

FOREIGN PATENT DOCUMENTS

| | | |
|---|---|---|
| DE | 10 2008 007 877 B3 | 11/2009 |
| DE | 10 2010 011 978 A1 | 9/2011 |
| DE | 10 2012 000 435 A1 | 7/2013 |
| EP | 0 976 636 A2 | 2/2000 |
| EP | 1 504 975 A1 | 2/2008 |
| EP | 2 615 003 B1 | 4/2017 |
| WO | WO 00/78591 A1 | 12/2000 |
| WO | WO 2007/065498 A1 | 6/2007 |
| WO | WO 2008/025398 A1 | 3/2008 |
| WO | WO 2009/046779 A1 | 4/2009 |
| WO | WO 2009/098003 A2 | 8/2009 |

OTHER PUBLICATIONS

German-language Written Opinion (PCT/ISA/237) issued in PCT Application No. PCT/EP2016/076410 dated Feb. 7, 2017 (Five (5) pages).
International Search Report (PCT/ISA/210) issued in PCT Application No. PCT/EP2016/076409 dated Feb. 6, 2017 with English-language translation (Five (5) pages).
German-language Written Opinion (PCT/ISA/210) issued in PCT Application No. PCT/EP2016/076409 dated Feb. 6, 2017 (five (5) pages).
German-language Office Action issued in counterpart German Application No. 102015119136.9 dated Aug. 4, 2016 (seven (7) pages).
Chinese Office Action issued in Chinese application No. 201680077999.7 dated Mar. 31, 2020, with partial English translation (Thirteen (13) pages).
Chinese Office Action issued in Chinese application No. 201680077999.7 dated Dec. 29, 2020, with partial English translation (Eleven (11) pages).

* cited by examiner

PNEUMATIC BRAKING DEVICE FOR A UTILITY VEHICLE

CROSS REFERENCE TO RELATED APPLICATIONS

This application is a continuation of PCT International Application No. PCT/EP2016/076410, filed Nov. 2, 2016, which claims priority under 35 U.S.C. § 119 from German Patent Application No. 10 2015 119 136.9, filed Nov. 6, 2015, the entire disclosures of which are herein expressly incorporated by reference.

This application contains subject matter related to U.S. application Ser. No. 15/972,967, entitled "Pneumatic Braking Device" filed on even date herewith May 7, 2018.

BACKGROUND AND SUMMARY OF THE INVENTION

The present invention relates to a pneumatic brake device for a utility vehicle, comprising at least one pneumatically actuable spring store brake cylinder and comprising an electronic parking brake device.

Pneumatic brake devices for utility vehicles (also referred to as commercial vehicles, for example trucks) which can also pull trailers are already known from the prior art. Systems of this kind are also equipped with a parking brake function which can be provided by an electronic parking brake device.

By way of example, in the United States of America, the parking brake function is realized by placing spring store brake cylinders both in the utility vehicle or tractor vehicle and also in the trailer. To this end, the respective spring stores are actuated by a pneumatic parking valve which fills or deaerates the spring stores directly, without the use of a relay valve. Here, the parking valve has a first valve part for the truck and a second valve part for the trailer. Said valve parts can be configured with different colors, for example such that the first valve part for the tractor vehicle has a yellow operating button and the second valve part for the trailer has a red operating button. Due to legal requirements, it may be necessary for the brake device to have a tractor protection valve. The tractor protection valve prevents a drop in the output air pressure for the service brake of the tractor vehicle in the event of a drop in pressure in the service brake of the trailer vehicle.

It is assumed here that compressed air may escape both from the compressed air line which provides compressed air to the trailer vehicle for the service brake and also from the compressed air line which provides compressed air to the trailer vehicle for the parking brake.

This is the case, for example, when the trailer vehicle becomes detached from the tractor vehicle and, in the process, both compressed air lines, which connect the tractor vehicle and the trailer vehicle, are torn away.

In other countries, a tractor protection valve of this kind is not used, but rather bistable valve units are used, as is known, for example, from DE 10 2008 007 877 B3.

As is known, in particular, from WO 2008/025398 A1, bistable valves are rejected in connection with the use of tractor protection valves, and instead it is ensured in some other way that it is possible to safely park the vehicle in the event of a breakdown in the electrical voltage supply.

Further pneumatic brake devices for utility vehicles with a tractor protection valve are known, for example, from DE 101 32 493 A1, WO 00/78591 A1, WO 2009/046779 A1 and U.S. Pat. No. 5,061,015.

The object of the present invention is to develop a pneumatic brake device for a utility vehicle of the kind outlined in the introductory part in an advantageous manner, in particular to the effect that said pneumatic brake device is of comparatively simple and safe construction and can have additional safety precautions in comparison to the brake devices known from the prior art and is operationally stable in the driving state and in the braked state.

According to the invention, this object is achieved by means of a pneumatic brake device in accordance with embodiments of the invention.

According to the invention, it is provided that a pneumatic brake device for a utility vehicle is provided with at least one pneumatically actuable spring store for a parking brake of the utility vehicle and with at least one electronic parking brake device, further having at least one electronic control unit, at least one first bistable valve unit and with at least one second bistable valve unit, at least further with a first valve device which can be connected up in such a way that, when there is a drop in the system pressure for supplying a parking brake of a trailer of the tractor vehicle, the parking brake of the trailer can be activated, and with a tractor vehicle protection valve.

The invention is based on the basic idea of providing a functionality in a pneumatic brake device for a utility vehicle so that the current condition of the brake device, that is to say driving or parking, is maintained even without electricity owing to the use of bistable valve units. The intention is then for the spring stores of the utility vehicle (tractor vehicle) and also of the trailer to be able to be aerated or deaerated by means of these two bistable valve units. Within the meaning of the invention, the term "bistable valve unit" is intended to be understood to mean, in particular, a pneumatically and/or electrically/electronically actuable valve unit, but not a control switch which pneumatically or electrically actuates a brake device or a parking brake device.

A valve device by means of which the spring stores of the trailer can be deaerated when spring stores of the truck (tractor vehicle) are aerated is additionally provided. This also includes, in particular, an emergency brake functionality which activates the parking brake of the trailer (emergency braking) when there is a drop in the system pressure for the trailer below a specific threshold value. Furthermore, a tractor protection valve is provided, by means of which a drop in the output air pressure for the service brake of the tractor vehicle in the event of a drop in pressure in the output air pressure for the service brake of the trailer is prevented. In other words, the tractor protection valve is arranged in such a way that the compressed-air connection between the tractor vehicle and the trailer vehicle can be interrupted in case of an emergency.

Furthermore, it can be provided that the parking brake of the tractor vehicle can be actuated by means of the first bistable valve unit and the parking brake of the trailer can be actuated by means of the second bistable valve unit. A simple design of the parking brake device is possible in this way.

Since a first bistable valve unit is provided for the tractor vehicle and a second bistable valve unit is provided for the trailer, a stable and robust design of the brake device or of the parking brake device is provided overall. This is because, owing to the use of the bistable valve units, it is possible to be able to maintain the respectively current condition even without electricity, so that stable operating states are possible, here in particular parking and driving.

The tractor vehicle protection valve can be a constituent part of the electronic parking brake device.

As an alternative, it can be provided that the tractor vehicle protection valve is a constituent part of an air treatment system of the pneumatic brake device.

The valve device can have at least one pressure sensor by means of which a drop in the system pressure below a prespecified threshold value can be ascertained and a signal can be generated, it being possible for the parking brake of the trailer to be activated by means of the electronic control unit on the basis of said signal. As a result, it is possible to establish in a simple and reliable manner whether there has been a drop in the system pressure in the trailer and the pressure there has fallen below a specific threshold value. The parking brake of the trailer can then be activated. This function is also called emergency braking.

Furthermore, it can be provided that the valve device has at least one pneumatic valve by means of which the parking brake of the trailer can be activated. As a result, it is possible to activate the parking brake of the trailer separately, independently of the brake device of the tractor vehicle.

The first and/or second bistable valve unit can comprise a bistable valve with feedback. The feedback can have the effect, for example, that an emergency braking function for the trailer can be integrated.

In this context, it can be provided that the bistable valve with feedback is a relay valve. It can be provided here in particular that a bistable valve function is achieved by the use of a relay valve as a bistable valve.

Furthermore, it can be provided that the relay valve for the first bistable valve unit is the relay valve of the utility vehicle. As a result, it is possible to use a valve which is present in any case, such as the relay valve of the tractor vehicle, for forming the bistability and the corresponding functionality which is intended to be achieved by a bistable valve unit.

In addition, it can be provided that the relay valve for the second bistable valve unit is the relay valve of the trailer. It is also the case here that, by virtue of a design of this kind, a valve which is present in any case can be used, as a result of which the design is simplified overall.

Furthermore, it can be provided that the bistable valve unit further has a throttle.

The volumetric flow rate of the feedback from the output of the relay valve to its control side can be limited by means of the throttle. As a result, it is possible to be able to better set the switching points of the relay valve.

Furthermore, it can be provided that the bistable valve unit further has a pressure sensor. As a result, it is possible, for example depending on the ascertained pressure values by means of the pressure sensor, to set a certain switching behavior of the bistable valve unit and to provide a corresponding functionality.

Furthermore, it can be provided that the bistable valve unit further has at least two solenoid valves. By means of connection to two solenoid valves, it is possible, for example, to correspondingly actuate the relay valve for example and to create bistability in a simple and reliable manner.

The valve device can be jointly formed by the relay valve of the trailer.

In this context, it is also contemplated that the valve device is formed by the relay valve of the trailer and two solenoid valves. Here, the term "valve unit" is intended to be understood, in particular, to the effect that a plurality of components of a pneumatic brake device interact with one another in a functional manner. Owing to the interaction of the relay valve of the trailer and the solenoid valves, it is possible to actuate the parking brake device of the trailer, that is to say the spring stores of the trailer, and to do so separately from the parking brake device of the tractor vehicle. This means that it is also possible to be able to aerate the spring stores of the trailer even when the spring stores of the tractor vehicle are deaerated.

Furthermore, it can be provided that the valve device has the relay valve of the trailer, at least two further solenoid valves and also a pressure sensor and a throttle. In this case too, the term "valve device" is intended to be understood to the effect that a plurality of components interact with one another for a specific functionality. Owing to the interaction of the relay valve of the trailer, at least a further two solenoid valves and also a pressure sensor, it is possible firstly to detect a drop in the system pressure for the parking brake of the trailer and a specific threshold value and, depending on this, in particular in interaction with the control electronics system of the pneumatic brake device, to switch the relay valve and the further two solenoid valves in such a way that the parking brake of the trailer can be activated, it being possible for this to be used as an emergency brake. In particular, the supply line downstream of the relay valve of the trailer to the spring stores of the trailer can be monitored by means of the pressure sensor.

The valve device can further have the relay valve of the trailer and at least one deaeration valve. Owing to the deaeration, it is possible to be able to deaerate the spring store of the trailer by means of the deaeration valve.

As an alternative, it is also contemplated that the first and/or second bistable valve unit comprises/comprises a bistable valve without feedback.

In particular, it is contemplated in this context that the bistable valve of the bistable valve unit without feedback is a bistable 3/2-way valve which actuates a relay valve.

The bistable valve can be a relay valve.

In particular, it can be provided that the bistable valve unit further comprises the relay valve of the tractor vehicle. In this connection, it is also contemplated that the relay valve of the tractor vehicle and also a further control valve jointly form the bistable valve unit in a functional respect.

Furthermore, it can be provided that the relay valve for the second bistable valve unit is the relay valve of the trailer.

The first and/or second bistable valve unit can further have a throttle. As a result, it is possible to be able to better set the first and/or second bistable valve unit in respect of their/its switching point.

Furthermore, it can be provided that the bistable valve unit further has a pressure sensor. For example, a drop in pressure in the trailer can be detected by means of the pressure sensor and then a switching operation can be created by means of corresponding valves, in particular solenoid valves, and also the relay valve or valves, and the spring stores, for example of the trailer, can be aerated by means of said switching operation.

In principle, it is feasible that a drop in pressure is recorded by means of a pressure sensor, whereupon the spring stores of the trailer are deaerated by means of an electrical signal and by means of at least one solenoid valve.

In this context, it is feasible, in particular, that the bistable valve unit further has at least two solenoid valves.

As an alternative and/or in addition, a solution can also be provided in which the spring stores of the trailer are deaerated by means of a pneumatic valve when a drop in the system pressure for the trailer below a specific threshold value is detected by means of the second valve device, so that the parking brake of the trailer is activated (emergency braking).

The valve device can be jointly formed by the relay valve of the trailer.

Furthermore, it can be provided that the valve device further has at least one solenoid valve and a pressure sensor. In addition, the valve device can also further have a throttle.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
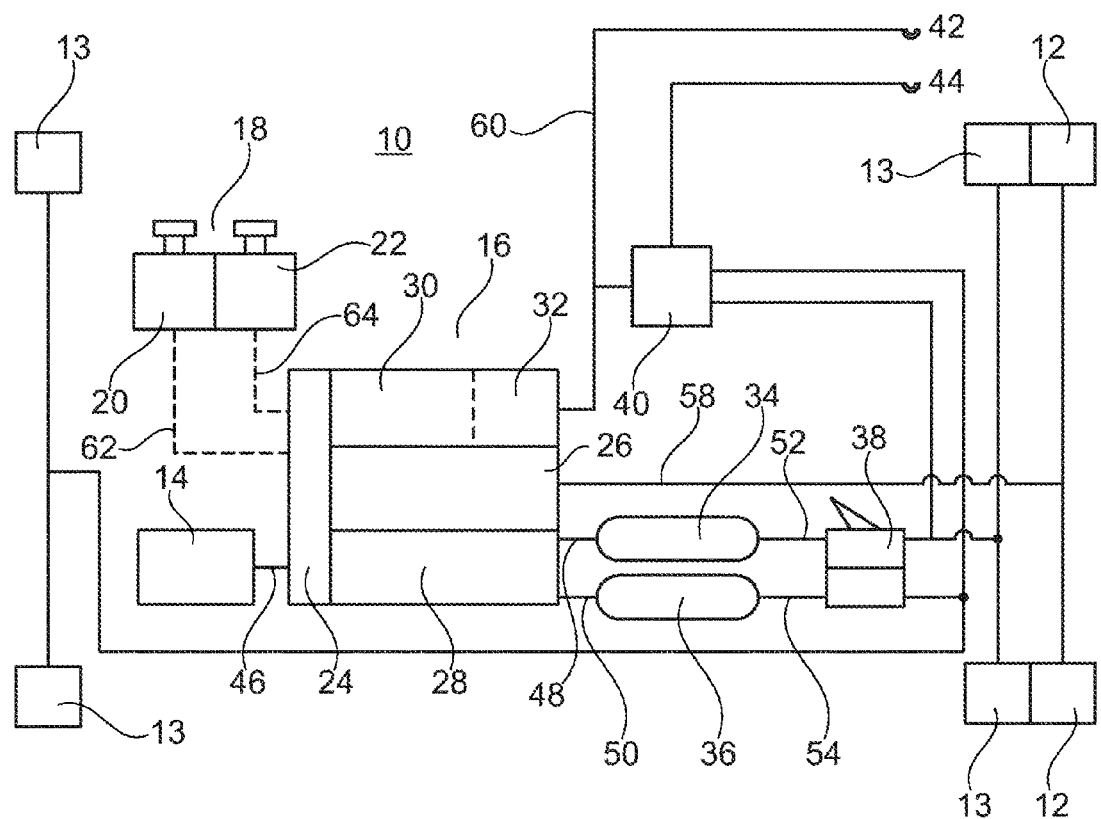
FIG. 1 is a schematic drawing of an exemplary embodiment according to the invention of a pneumatic brake device for a utility vehicle.

FIG. 1 shows a pneumatic brake device 10 for a utility vehicle, for example a truck (not illustrated in any detail).

The pneumatic brake device 10 has a plurality of pneumatically actuable spring stores 12 for the parking brake of the utility vehicle, also called tractor vehicle, and also pneumatically actuable brake cylinders 13 of the service brake for the front axle and also for the rear axle or the rear axles. In the exemplary embodiment shown, the spring store 12 and the brake cylinder 13 are designed as a spring store brake cylinder on the rear axle, with the spring store 12 for the parking brake function and with the brake cylinder 13 for the service brake.

Furthermore, a compressor 14 which is connected to an electronic parking brake device 16 is provided.

Furthermore, a parking valve switching element 18 which can have a first switch 20 and a second switch 22 is provided.

The electronic parking brake device 16 has a control electronics system 24, a first bistable valve unit 26, an air treatment arrangement 28 and also a second bistable valve unit 30 and a valve device 32. A first compressed-air container 34 and a second compressed-air container 36 are provided downstream of the electronic parking brake device 16.

The foot brake valve 38 of the brake device 10 is further shown. Furthermore, a tractor vehicle protection valve 40 is provided.

The pneumatic brake device 10 further has a connection 42 for the parking brake of a trailer of the utility vehicle and also a further separate connection 44 for the service brake of the trailer.

The compressor 14 is connected to the parking brake device 16 via a line 46. Lines 48 and 50, which lead to the container 34 and, respectively, to the container 36 adjoin the air treatment arrangement 28 downstream of the parking brake device 16.

The foot brake valve 38 is connected to the first container 34 via the line 52 and to the second container 36 via the line 54. The supply lines and line branches adjoin the brake cylinders and, respectively, spring store brake cylinders 12 downstream of the foot brake valve 38. The tractor vehicle protection valve 40 is likewise connected to said line, wherein the compressed air which flows from said line branch to the tractor vehicle protection valve 40 and then flows further to the connection 44 for the service brake of the trailer or to the connection 42 for the spring store of the trailer, initially has to be routed through the tractor vehicle protection valve 40. The foot brake valve 38 is connected to the tractor vehicle protection valve 40 via a line 56.

The first bistable valve unit 26 is connected to the spring store brake cylinders of the rear axle via a line 58.

The valve device 32 is connected to the connection 42 for the spring stores of the trailer via a line 60.

The control electronics system 24 is connected to the parking valve switching element 18, wherein a first signal line 62 from the first switch is connected to the control electronics system 24 and a second line 64 is connected to the electronics system 24 which establishes a connection to the second switch of the parking valve switching element 18.

The pneumatic brake device 10 therefore has a plurality of pneumatically actuable spring stores 12 for the parking brake of the utility vehicle, and also an electronic parking brake device 16 which itself in turn has a control electronics system 24.

Furthermore, a constituent part of the electronic parking brake device 16 is a first bistable valve unit 26 for aerating and deaerating the spring stores 12 of the parking brake of the tractor vehicle, and also a second bistable valve unit 30 for aerating and deaerating the spring store brake cylinders of the trailer, so that the spring stores of the parking brake device of the trailer of the tractor vehicle can be aerated by means of the second bistable valve unit 30, and also a valve device 32 which can be connected up in such a way that the parking brake device of the trailer can be activated when there is a drop in the system pressure for the parking brake of the trailer of the tractor vehicle.

The parking brake of the tractor vehicle with the spring stores 12 can be actuated by means of the first bistable valve unit 26 and the parking brake of the trailer can be actuated by way of the second bistable valve unit 30, also by means of the valve device 32. The second bistable valve unit 30 is connected to the connection 42 to the spring store brake cylinders of the parking brake of the trailer via the line 60.

Here, the tractor vehicle protection valve 40 is a constituent part of the brake device, but, as an alternative, can also be designed as a constituent part of the electronic parking brake device 16 or as a constituent part of the air treatment system 28 of the pneumatic brake device 10.

The functioning of the pneumatic brake device 10 is as follows here:

The electronic parking brake device 16 comprises a control electronics system 24 and processes the control signals which are transmitted by the electronic parking valve 18.

Furthermore, information exchange takes place with the control electronics system 24 of the truck (not shown in detail).

The first bistable valve unit 26 and the second bistable valve unit 30 also each maintain their current condition without electricity. Said valves can aerate or deaerate the spring store brake cylinders 12 of the tractor vehicle or of the trailer (via the line 60 and the connection 42) directly or jointly by means of one or more relay valves.

The second bistable valve unit 30 can aerate the spring stores of the trailer when the spring stores of the truck are deaerated. This is necessary, for example, for the trailer test function.

The valve device 32 can deaerate the spring stores of the trailer, specifically via the line 60 and the connection 42, when the spring stores of the truck are aerated. This includes, in particular, an emergency brake functionality which activates the parking brake of the trailer (so-called emergency braking function) when there is a drop in the system pressure for the trailer below a specific threshold value.

Actuation of the brake device 10 by means of the parking valve switching element 18 comprising the switches 20 and 22 can be performed for the following operating states as follows.

In the driving state, the switch 20 for operating the parking brake device of the tractor vehicle and the switch 22 for operating the parking brake device of the trailer for example are pressed (as an alternative other operating positions are also feasible).

As a result, the first bistable valve unit 26 and the second bistable valve unit 30 are connected through, while the valve device 32 is not connected through.

As a result, both the spring store brake cylinders 12 of the tractor vehicle and also the spring store brake cylinders 12 of the trailer are released.

In the parked state, the two switches 20 and 22 are pulled, so that the first bistable valve unit 26 and the second bistable valve unit 30 and the valve device 32 are not connected through.

Therefore, the spring store brake cylinders 12 of the tractor vehicle are switched in such a way that the brakes of the tractor vehicle are activated. This is also true of the spring store brake cylinders 12 of the trailer which are likewise switched in such a way that the brakes of the trailer are activated.

An operating state in which the parking brake of the tractor vehicle is activated, but that of the trailer is not, can be used for the purpose of filling the trailer. This can also be used in order to carry out the so-called trailer test. The switch 20 is pulled and the switch 22 is pressed (activated). As a result, the first bistable valve unit 26 is not connected through, but the second bistable valve unit 30 is connected through. The valve device 32 is likewise not connected through.

The result of this is that the spring stores 12 of the parking brake of the tractor vehicle are switched in such a way that the tractor vehicle is braked and the spring stores of the parking brake of the trailer are switched in such a way that said spring stores are released.

In the "Park trailer" operating state (braking only by means of the trailer), the switch 20 is pressed and the switch 22 is pulled.

Consequently, the first bistable valve unit 26 is activated, the second bistable valve unit 30 is not activated, and the valve device 32 is not activated.

The result of this is that the spring stores 12 of the parking brake of the tractor vehicle are switched in such a way that the tractor vehicle is unbraked and the spring stores of the parking brake of the trailer are activated, so that the trailer is braked.

In the "Emergency braking" operating state which is automatically activated, specifically when a drop in the system pressure for the parking brake of the trailer is detected, the tractor/trailer combination, comprising tractor vehicle and trailer, is usually in the driving state, that is to say the switch 20 and the switch 22 are both pressed. In contrast to the above-described driving state in which the first bistable valve unit 26 and the second bistable valve unit 30 are connected through but the valve device 32 is not connected through, the valve device 32 is now activated and the second bistable valve unit 30 is moved from the connected-through state to the non-connected-through state.

The result is that the spring stores 12 of the parking brake of the tractor vehicle are further switched in such a way that the tractor vehicle is unbraked, but the spring store brake cylinders of the trailer are switched in such a way that they are switched from the unbraked state to the braked state.

FIGS. 2 to 5 relate to possible embodiments of the electronic parking brake device with feedback, as can be used in the exemplary embodiment shown in FIG. 1 of a pneumatic brake device 10.

Each of the shown embodiments of the electronic parking brake devices 116 (FIG. 2), 216 (FIG. 3), 316 (FIG. 4) and 416 (FIG. 5) is intended to be understood as a possible embodiment of the electronic parking brake device 16, as roughly schematically shown in FIG. 1.

Figure 2:
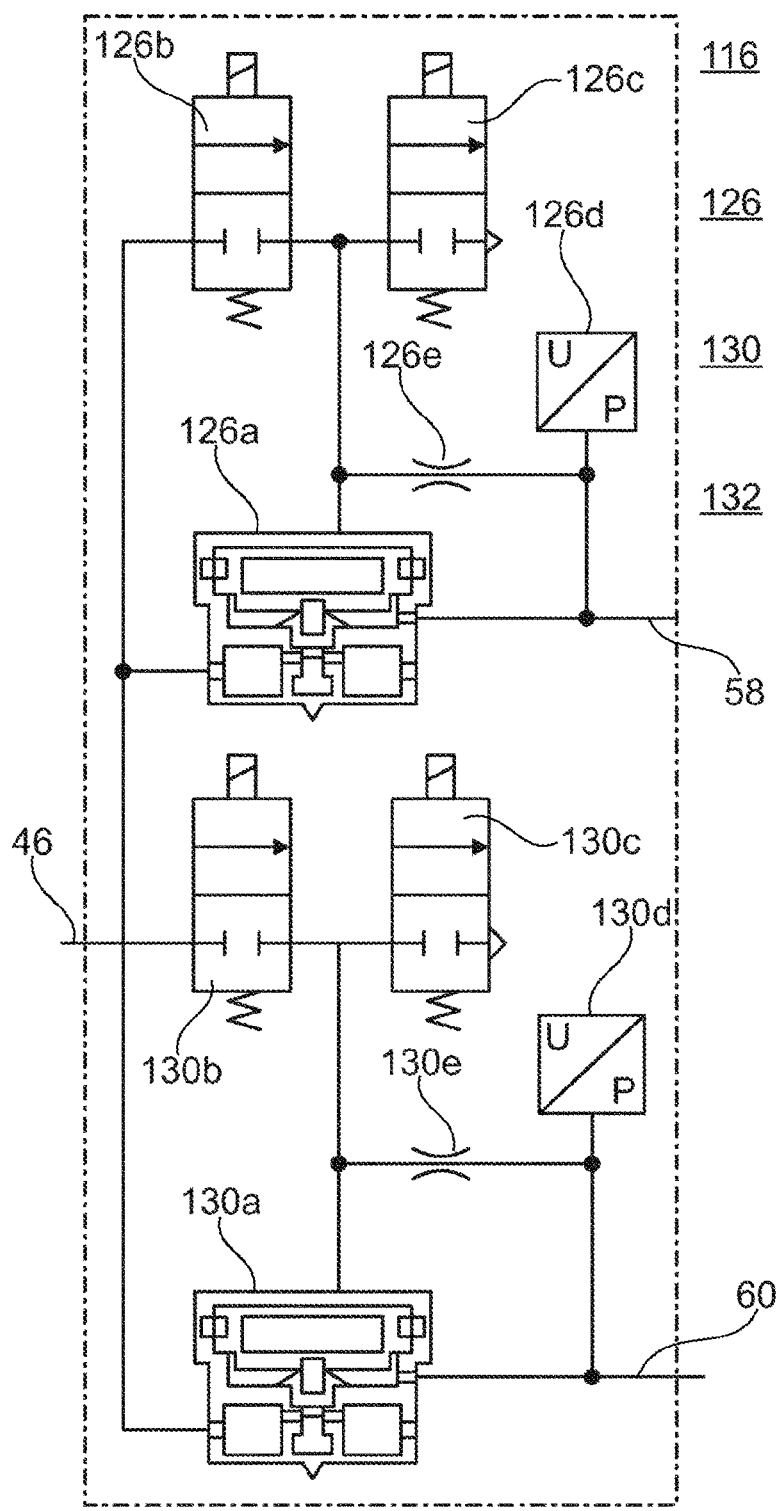
FIG. 2 is a schematic illustration of a first embodiment of an electronic parking brake device.

FIG. 2 shows a first possible embodiment of an electronic parking brake device 116 comprising a bistable valve unit 126 with feedback.

The bistable valve unit 126 with feedback comprises the functionally interacting relay valve of the tractor vehicle 126a, a solenoid valve 126b, a further solenoid valve 126c, a pressure sensor 126d and also a throttle 126e.

The second bistable valve unit 130 comprises the functionally interacting relay valve of the trailer 130a, a solenoid valve 130b, a further solenoid valve 130c, a pressure sensor 130d and also a throttle 130e.

The valve device 132 is functionally formed by the relay valve of the trailer 130a, the solenoid valve 130c, the pressure sensor 130d and also the throttle 130e.

Both for the first bistable valve unit 126, the second bistable valve unit 130 and the valve device 132, the solenoid valves, the pressure sensor and also the throttles serve to actuate and set the relay valves, to set the switching points and also to ensure a bistable function.

Figure 3:
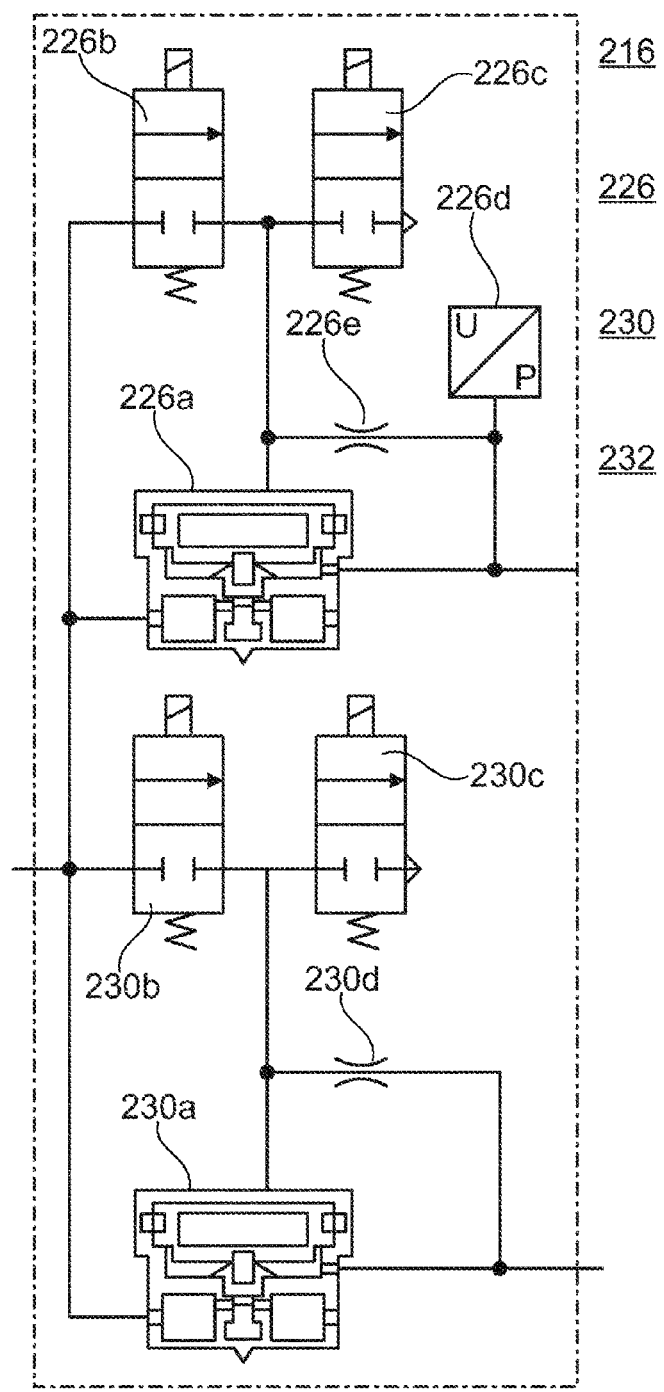
FIG. 3 is a schematic illustration of a second embodiment of an electronic parking brake device.

FIG. 3 shows a schematic view of a further exemplary embodiment of an electronic parking brake device 216 which illustrates a possible embodiment of the parking brake device 16 shown in FIG. 1.

The electronic parking brake device 216 according to FIG. 3 is an embodiment with a pressure sensor, but without additional elements.

The first bistable valve unit 226 is formed by the relay valve of the tractor vehicle 226a, a solenoid valve 226b, a further solenoid valve 226c, a pressure sensor 226d and a throttle 226e, The second bistable valve unit 230 is formed by the relay valve of the trailer 230a, a solenoid valve 230b, a further solenoid valve 230c and also a throttle 230d.

Here, the valve device 232 is formed solely by the relay valve of the trailer 230a and the throttle 230d.

The solenoid valves, the pressure sensor and the throttle also serve to define and to ensure the bistable function, the switching characteristics and also the switching points here.

Figure 4:
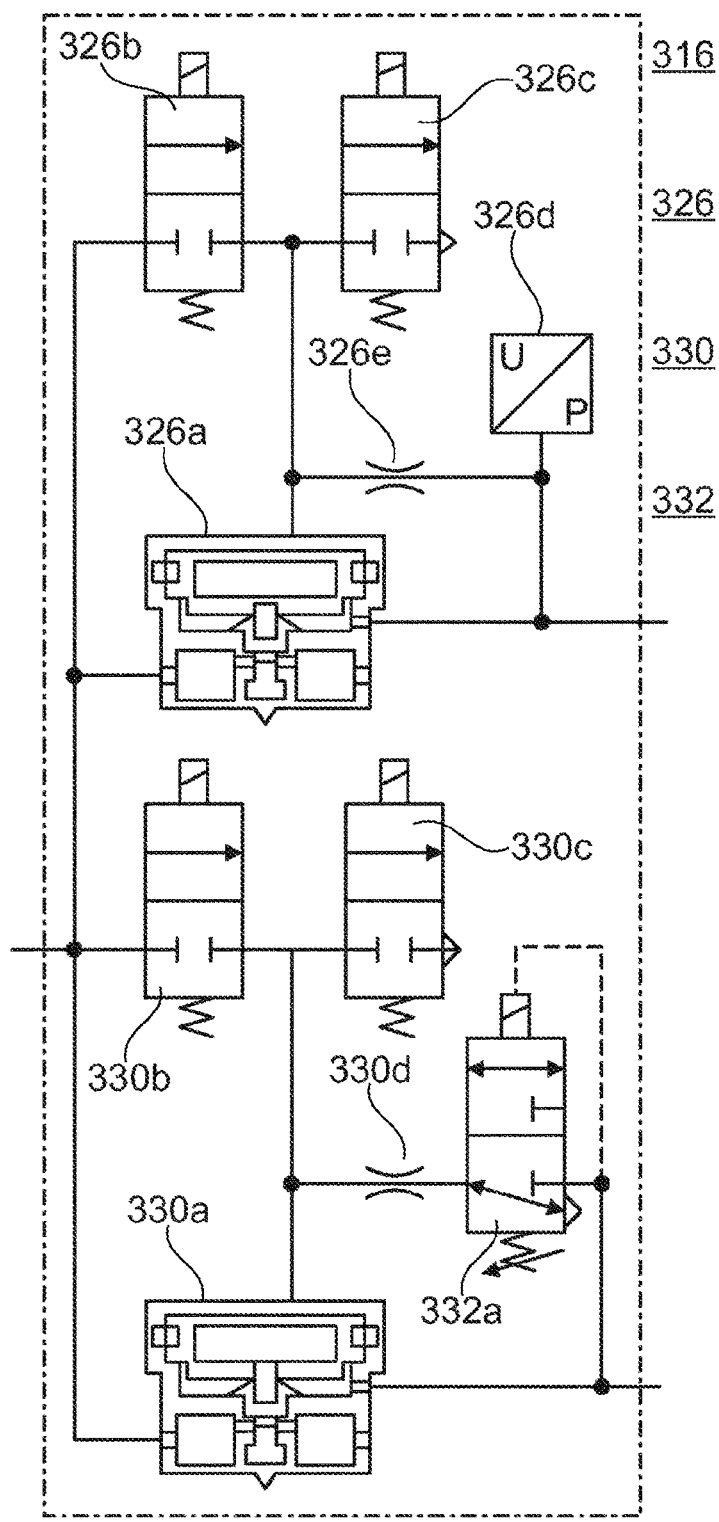
FIG. 4 is a schematic illustration of a third embodiment of an electronic parking brake device.

FIG. 4 shows a schematic illustration of a further exemplary embodiment of an electronic parking brake device 316 which, in the exemplary embodiment according to FIG. 1, illustrates a possible embodiment of the electronic parking brake device 16 shown there.

Here, the first bistable valve unit 326 is formed by the relay valve of the tractor vehicle 326a, a first solenoid valve 326b, a second solenoid valve 326c, a pressure sensor 326d and also a throttle 326e.

The second bistable valve unit 330 is formed by the relay valve of the trailer 330a, a solenoid valve 330b, a further solenoid valve 330c and also a throttle 330d.

The valve device 332 is formed by the relay valve of the trailer 330a and also a deaeration valve 332a.

The parking brake device 316 according to FIG. 4 is a parking brake device comprising a pneumatic valve in the feedback line.

Figure 5:
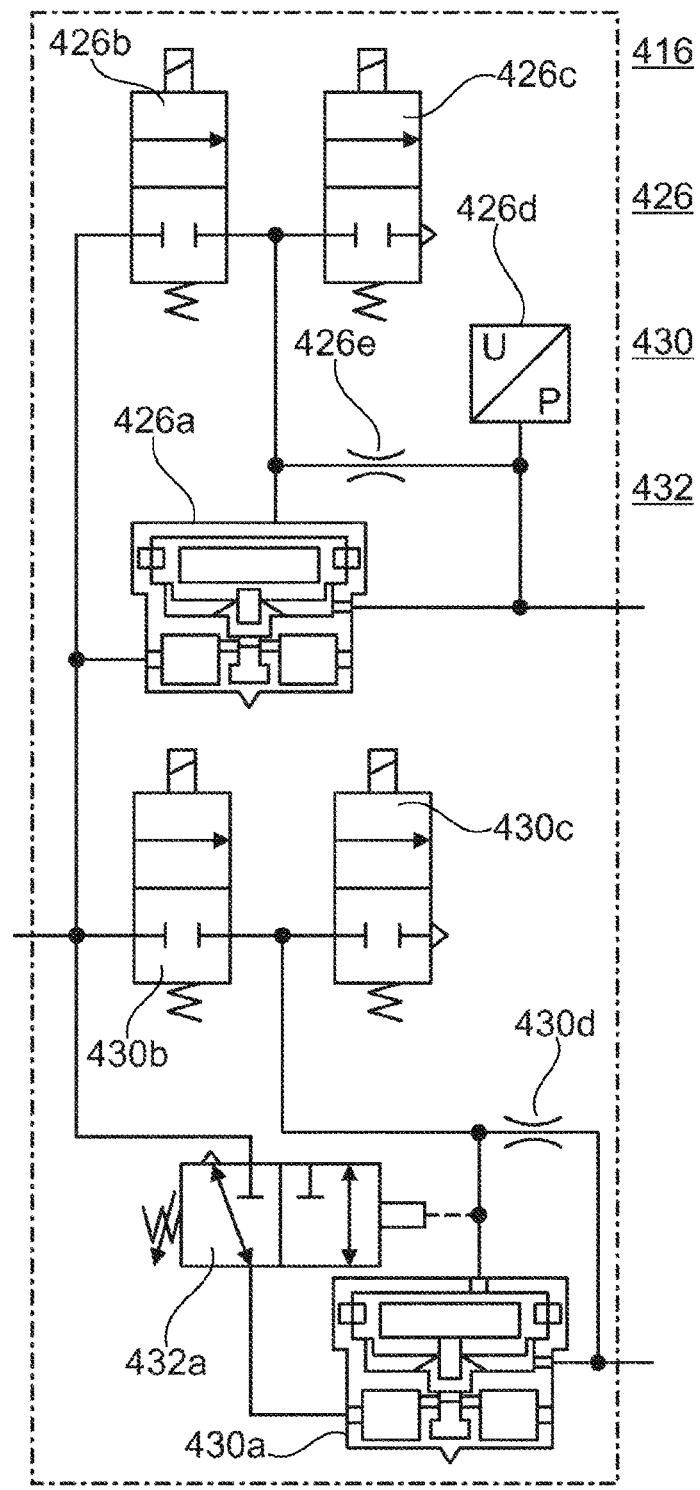
FIG. 5 is a schematic illustration of a fourth embodiment of an electronic parking brake device.

FIG. 5 shows a further embodiment of an electronic parking brake device 416 which illustrates a possible embodiment of the electronic parking brake device 16 shown in FIG. 1.

This embodiment is an embodiment with a pneumatic valve in the supply line.

Here, the first bistable valve unit 426 is formed by the relay valve of the tractor vehicle 426a, a first solenoid valve 426b, a second solenoid valve 426c, a pressure sensor 426d and also a throttle 426e.

The second bistable valve unit 430 is formed by the relay valve of the trailer 430a, a solenoid valve 430b, a further solenoid valve 430c and also a throttle 430d.

The valve device 432 is formed by the relay valve of the trailer 430a and also a deaeration valve 432a.

However, in contrast to the exemplary embodiment according to FIG. 4 where the pneumatic deaeration valve 332a is arranged in the feedback line for the relay valve 330a, the pneumatic deaeration valve 432a is located in the supply line for the relay valve of the trailer here.

Figure 6:
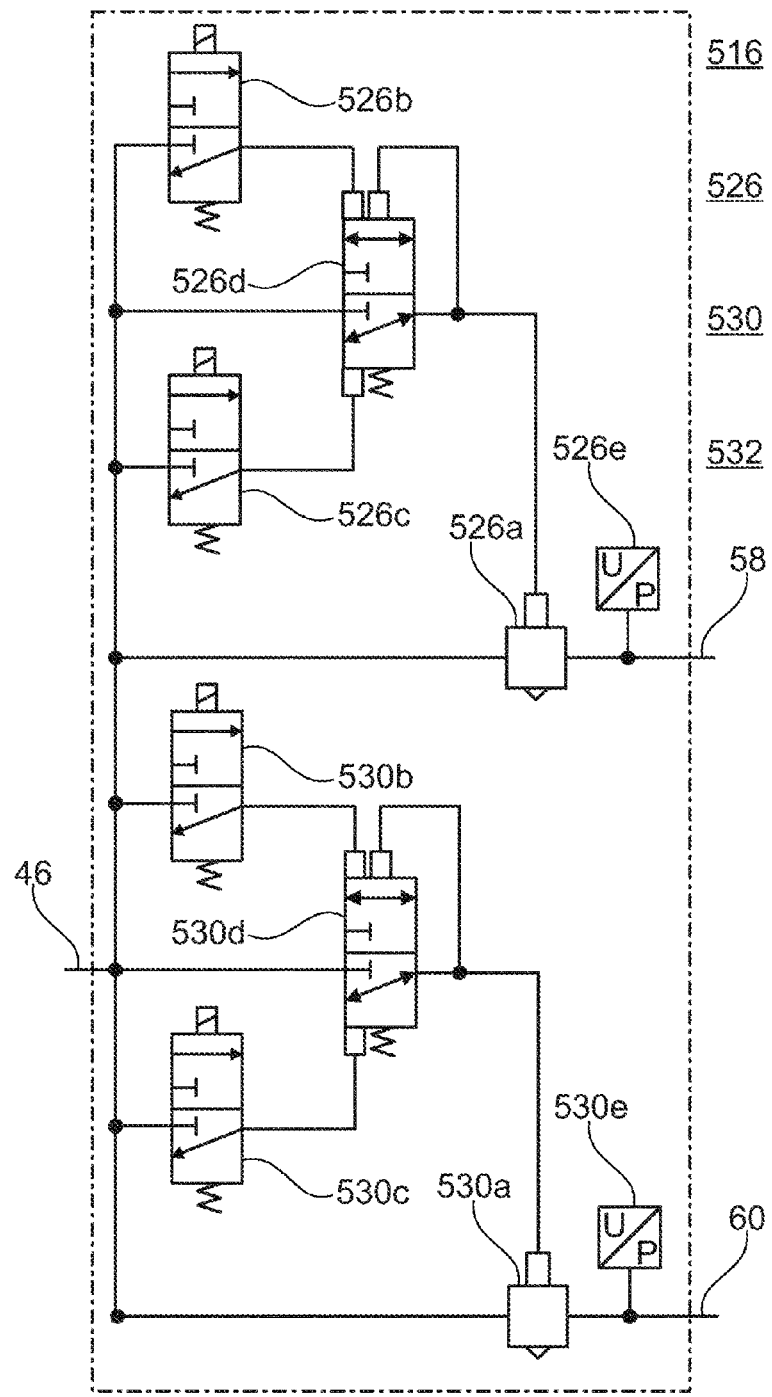
FIG. 6 is a schematic illustration of a fifth embodiment of an electronic parking brake device.
Figure 7:
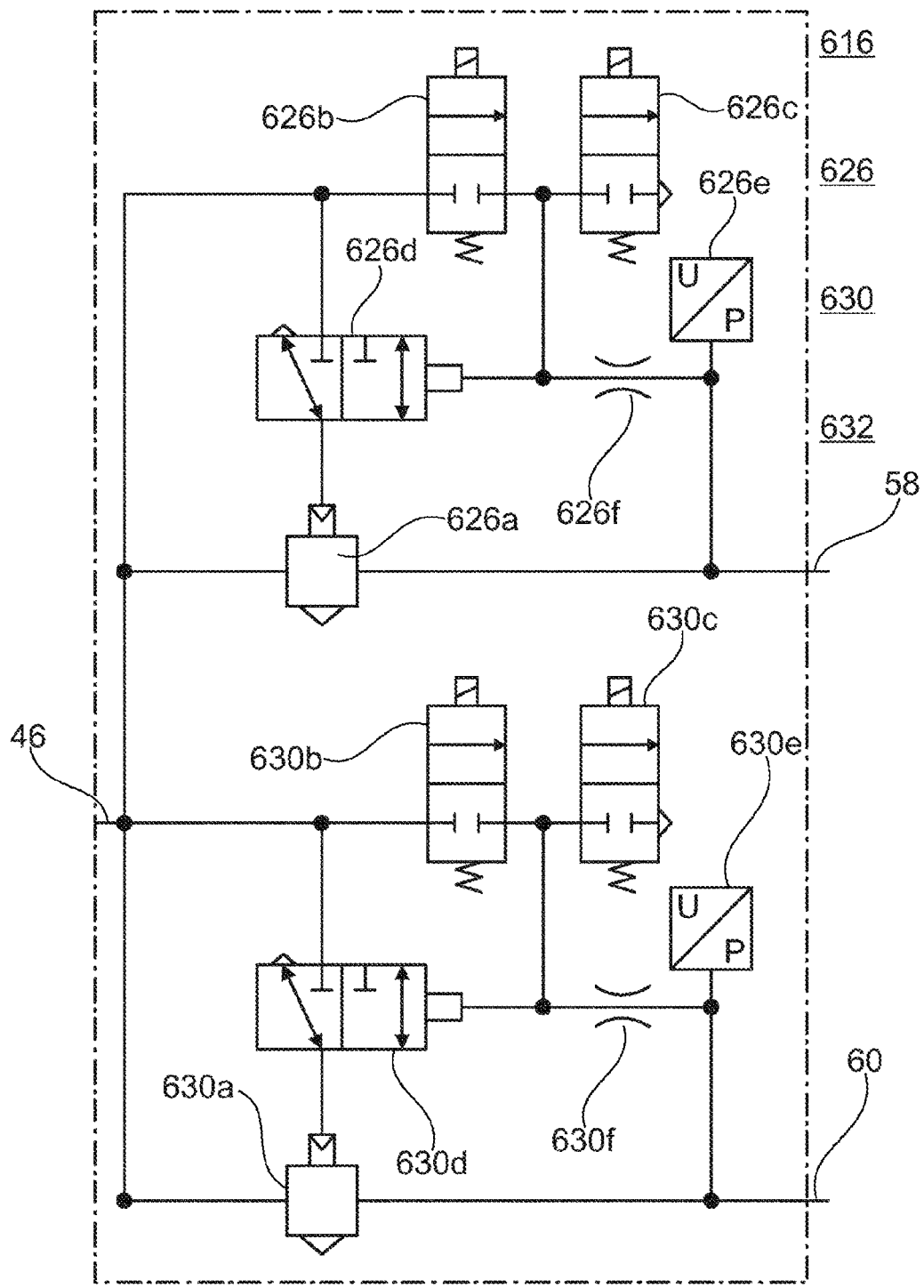
FIG. 7 is a schematic illustration of a sixth embodiment of an electronic parking brake device.

FIGS. 6 and 7 show embodiments of an electronic parking brake device 516 (FIG. 6) and also of an electronic parking brake device 616 (FIG. 7).

In both cases, these embodiments can be a possible refinement of the electronic parking brake device 16 shown in FIG. 1.

The two embodiments of an electronic parking brake device 516 and 616 are embodiments with bistable valve units without feedback.

In the case of the electronic parking brake device 516 according to FIG. 6, the first bistable valve unit 526 is formed by the relay valve of the tractor vehicle 526a, a solenoid valve 526b, a further solenoid valve 526c, a control valve device 526d and also a pressure sensor 526e.

The second bistable valve unit 530 comprises the relay valve of the trailer 530a, a solenoid valve 530b, a further solenoid valve 530c, a control valve 530d and also a pressure sensor 530e.

The valve device 532 is formed by the relay valve of the trailer 530a, the solenoid valve 530c, the control valve 530d and also the pressure sensor 530e here.

In the case of the electronic parking brake device 616 according to FIG. 7, the first bistable valve unit 626 is formed by the relay valve of the tractor vehicle 626a, a solenoid valve 626b, a further solenoid valve 626c, a control valve device 626d and also a pressure sensor 626e. In addition, the first bistable valve unit 626, as distinct from the embodiment shown in FIG. 6, further has a throttle 626f.

The second bistable valve unit 630 comprises the relay valve of the trailer 630a, a solenoid valve 630b, a further solenoid valve 630c, a control valve 630d and also a pressure sensor 630e. Furthermore, the embodiment according to FIG. 7, as distinct from the embodiment according to FIG. 6, further has a throttle 630f.

The valve device 632 is formed by the relay valve of the trailer 630a, the solenoid valve 630c, the control valve 630d, the pressure sensor 630e and also the throttle 630f here.

FIG. 7 shows the parking brake device 616 in the parked state.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMERALS

10 Pneumatic brake device
12 Spring store
13 Brake cylinder
14 Compressor
16 Electronic parking brake device
18 Parking valve switching element
20 First switch
22 Second switch
24 Electronic control unit
26 First bistable valve unit
28 Air treatment arrangement
30 Second bistable valve unit
32 Valve device
34 First compressed-air container
36 Second compressed-air container
38 Foot brake valve
40 Tractor vehicle protection valve
42 Connection
44 Separate connection
46 Line
48 Line
50 Line
52 Line
54 Line
56 Line
58 Line
60 Line
62 First signal line
64 Second signal line
116 Electronic parking brake device
126 First bistable valve unit
126a Relay valve
126b Solenoid valve
126c Solenoid valve
126d Pressure sensor
126e Throttle
130 Second bistable valve unit
130a Relay valve of the trailer
130b First solenoid valve
130c Second solenoid valve
130d Pressure sensor
130e Throttle
132 Valve device
132a Solenoid valve
132b Pressure sensor
216 Electronic parking brake device
226 First bistable valve unit
226a Relay valve
226b Solenoid valve
226c Solenoid valve
226d Pressure sensor
226e Throttle 230 Second bistable valve unit
230a Relay valve of the trailer
230b First solenoid valve
230c Second solenoid valve
230d Throttle
232 Valve device
232a Solenoid valve
232b Pressure sensor
316 Electronic parking brake device
326 First bistable valve unit
326a Relay valve of the tractor vehicle
326b Solenoid valve
326c Solenoid valve
326d Pressure sensor
326e Throttle
330 Second bistable valve unit
330a Relay valve
330b Solenoid valve
330c Solenoid valve
330d Throttle
332 Valve device
332a Deaeration valve
416 Electronic parking brake device
426 First bistable valve unit
426a Relay valve of the tractor vehicle
426b Solenoid valve
426c Solenoid valve
426d Pressure sensor
426e Throttle
430 Second bistable valve unit
430a Relay valve
430b Solenoid valve
430c Solenoid valve
430d Throttle
432 Valve device
432a Deaeration valve
516 Electronic parking brake device
526 First bistable valve unit
526a Relay valve
526b Solenoid valve
526c Solenoid valve
526d Control valve device
526e Pressure sensor
530 Second bistable valve unit
530a Relay valve
530b Solenoid valve
530c Solenoid valve
530d Control valve
530e Pressure sensor
532 Valve device
616 Electronic parking brake device
626 First bistable valve unit
626a Relay valve
626b Solenoid valve
626c Solenoid valve
626d Control valve device
626e Pressure sensor
626f Throttle
630 Second bistable valve unit
630a Relay valve
630b Solenoid valve
630c Solenoid valve
630d Control valve
630e Pressure sensor
630f Throttle
632 Valve device

What is claimed is:

1. A pneumatic brake device for a utility vehicle, comprising:
   at least one pneumatically actuable spring store for a parking brake of the utility vehicle;
   an electronic parking brake device, comprising
   at least one electronic control unit,
   at least one first bistable valve unit and at least one second bistable valve unit,
   at least one valve device which is connectable such that, when there is a drop in system pressure for supplying a parking brake of a trailer of the tractor vehicle, the parking brake of the trailer is activatable, and
   a tractor vehicle protection valve;
   wherein one or both of the first and the second bistable valve units comprise a bistable valve with feedback;
   wherein the bistable valve is a relay valve; and
   wherein the bistable valve unit further has a pressure sensor.

2. The pneumatic brake device as claimed in claim 1, wherein
   the parking brake of the utility vehicle is actuatable by the first bistable valve unit and the parking brake of the trailer is actuatable by the second bistable valve unit.

3. The pneumatic brake device as claimed in claim 1, wherein
   the tractor vehicle protection valve is a constituent part of the electronic parking brake device.

4. The pneumatic brake device as claimed in claim 1, wherein
   the tractor vehicle protection valve is a constituent part of an air treatment system of the pneumatic brake device.

5. The pneumatic brake device as claimed in claim 1, wherein
   the valve device has at least one pressure sensor by which a drop in the system pressure below a prespecified threshold value is determinable and a signal can be generated, it being possible for the parking brake of the trailer to be activated by the electronic control unit on the basis of said signal.

6. The pneumatic brake device as claimed in claim 1, wherein
   the valve device comprises at least one pneumatic valve by which the parking brake of the trailer is activatable.

7. The pneumatic brake device as claimed in claim 1, wherein
   the relay valve for the first bistable valve unit is the relay valve of the utility vehicle.

8. The pneumatic brake device as claimed in claim 1, wherein
   the relay valve for the second bistable valve unit is the relay valve of the trailer.

9. The pneumatic brake device as claimed in claim 1, wherein
   the bistable valve unit further has a throttle.

10. The pneumatic brake device as claimed in claim 1, wherein
    the bistable valve unit further has at least two solenoid valves.

11. The pneumatic brake device as claimed in claim 1, wherein
    the valve device is jointly formed by the relay valve of the trailer.

12. The pneumatic brake device as claimed in claim 11, wherein
the valve device further has at least two solenoid valves, a pressure sensor and a throttle.

* * * * *